Oct. 9, 1962 G. A. M. PETERSEN 3,057,091
REVERSIBLE TOOTH HAVING RESILIENT RETAINING MEANS
Filed April 19, 1960
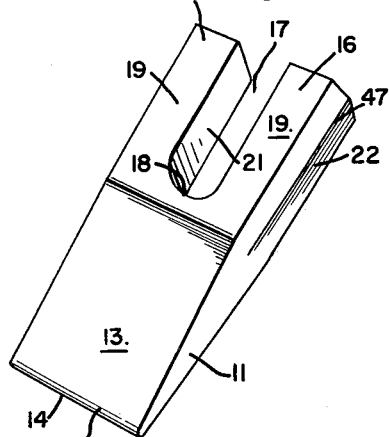
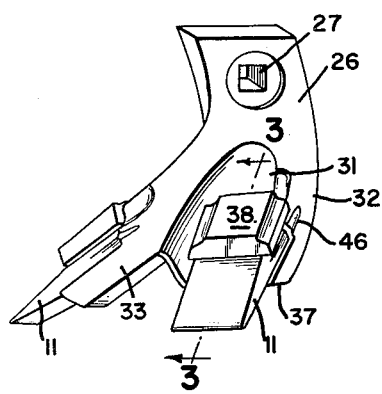
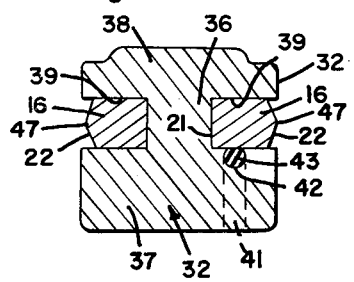
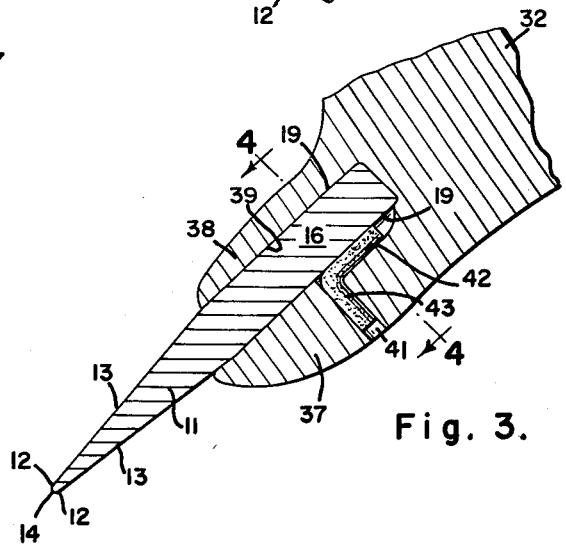
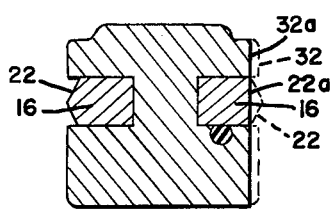
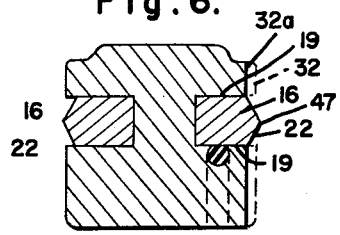
INVENTOR
Gerald A.M. Petersen
BY *Julian Caplan*
attorney

United States Patent Office 3,057,091
Patented Oct. 9, 1962

3,057,091
REVERSIBLE TOOTH HAVING RESILIENT
RETAINING MEANS
Gerald A. M. Petersen, 460 Kifer Road,
Santa Clara, Calif.
Filed Apr. 19, 1960, Ser. No. 23,317
The terminal portion of the term of the patent subsequent
to Jan. 24, 1978, has been disclaimed
7 Claims. (Cl. 37—142)

This invention relates to a new and improved reversible and replaceable tooth for earth-digging equipment. Reference is made to co-pending patent applications Serial No. 682,720 filed September 9, 1957, now Patent No. 2,952,085, and Serial No. 794,544, filed February 20, 1959, now Patent No. 2,968,880, of which the present application is a continuation-in-part.

The present invention relates to a tooth for an earth-digging machine such as an earth auger wherein a shank designed to hold one or a plurality of teeth is attached to the auger or to a holder on the auger shaft. A plurality of teeth may be affixed to the shank plate suitably positioned for effective digging action. As the auger is rotated, the teeth dig into the earth and the auger conveys the dirt to the surface. In certain soil conditions, wear not only on the teeth but on the shank is severe. This is particularly true of that portion of the shank adjacent the outer periphery and most particularly on the outside edge thereof. The present invention provides a reversible tooth which is also replaceable. As the tooth is worn by the digging action, one of its cutting edges is worn away. Thereupon the tooth may be reversed until the tooth is completely worn. Thereafter, a new tooth may be installed in the shank plate to replace the worn tooth.

One of the particular features of the present invention is the fact that the shank and tooth are so constructed and interrelated that after the shank edge is partially worn away, the additional wear is borne by the side edge of the tooth. Further, when the tooth is reversed a second side edge is presented to the outside of the assembly and this new tooth edge carries the burden of additional wear. When the tooth is replaced, the new side edges of the new tooth likewise assume the wear. Accordingly, the shank is protected against severe wear conditions by the side edge of the tooth. This feature is of considerable importance in that it prolongs the life of the shank. It will be understood that, in accordance with the present invention, reversal and replacement of teeth is a relatively simple operation, whereas replacement of a shank plate is time consuming and difficult from a mechanical standpoint in that precise positioning of the shank plate is essential for proper digging characteristics. Thus, the protection of the shank plate against wear is of considerable importance in digging operations.

Although the present invention is described in considerable detail in connection with attachment to a shank plate for an auger, nevertheless it will be understood that the means of attachment of the tooth to the shank has other applications, such as in many other digging tools.

As illustrated and described in the applications of which this invention is a continuation-in-part, a tooth for an earth-digging machine has a tapered distal portion which performs the digging function and a bifurcated proximal portion composed of two prongs separated from each other by a rectangular slot which extends forwardly from the proximal end of the tooth. I have invented and described in the foregoing applications various means whereby such a tooth may be retained in a shank plate attached to digging equipment such as earth augers, trenching machines and a wide variety of other digging tools.

The present invention is characterized by the fact that the shank is formed with a pair of recesses extending rearwardly from the forward end so that the resulting shape of the shank is substantially H-shaped in cross section and has a vertical web fitting into the slot in the proximal end of the tooth. Two features of the present invention are of considerable importance. One is that a resilient insert is installed in one of the horizontal legs of a H-shaped shank and engages one of the horizontal surfaces of the tooth prongs, thereby securing the tooth to the shank in such manner that it may be conveniently removed when required for reversal or replacement. A still further feature of the invention is the fact that one of the side edges of the tooth is substantially co-planar wih one of the side edges of the shank. Thus as the shank edge wears, the side edge of the tooth is exposed and assumes most of the burden of additional wear. When the tooth is reversed, an unworn side tooth edge is presented and this further protects the shank against wear. Additionally when the tooth is replaced two more side edges may be used to protect the shank, thereby prolonging the life thereof.

A further feature of the present invention is the fact the use of bolts, metal keys, and similar fastening means to secure the tooth to the shank is eliminated, thereby eliminating much of the difficulty heretofore occasioned in securing teeth to shanks. It will be apparent that the resilient insert hereinafter described in detail is protected from wear and abrasion which are the conditions most likely to cause failure in conventional teeth. A conventional tooth, commonly used for the same purpose as the present invention is formed with a socket into which a stud on the shank plate fits. Various difficulties have arisen in the use of this construction which are eliminated in the construction which is the subject of this invention. The present invention is characterized by the fact that the resilient insert is situated deep inside the shank where it is protected by the tooth and shank, and further that the configuration of both the tooth and the surrounding shank is such as to inhibit lodging of abrasive material in a position where wear will occur.

An advantage of the present invention is the facility with which the tooth may be installed and removed, and the fact that no special tools are required for such purpose.

A still further advantage of the invention is the fact that the resilient insert accommodates minor variations in the construction of the tooth and shank plate, thereby making close tolerances unnecessary and further accommodates wear of the parts with the passage of time.

Accordingly, one of the principal objects and advantages of the present invention is the provision of a tooth which may be attached to and removed from a shank plate or other portion of an earth-digging tool or other piece of similar equipment with a minimum of time and effort.

Another object and advantage of the invention is the provision of a reversible tooth which may be used first on one side and, when worn, may be turned over and used on the other side. One of the particular features of the invention is the facility with which the tooth may be reversed and, after having been reversed, securely locked in position with a minimum of labor and without the use of special tools or equipment.

Still another feature of the invention is the provision of cooperating means on the tooth and shank plate or other portion of the equipment to which the tooth is attached, which assist in securing the tooth in place.

A still further feature of the invention is the provision of cooperating means on the tooth and shank plate to which it is attached, which prevent the tooth from being displaced from its proper position when the tooth is subjected to severe stress, such as striking a hard object at one corner of the tooth.

In the drawings:

FIG. 1 is a perspective view of a shank plate and a pair of teeth installed therein;

FIG. 2 is a perspective view of a tooth formed in accordance with this invention;

FIG. 3 is a transverse longitudinal sectional view taken substantially along the line 3—3 of FIG. 1;

FIG. 4 is a transverse sectional view taken substantially along the line 4—4 of FIG. 3 showing the condition of tooth and shank plate when both are relatively new;

FIG. 5 is a view similar to FIG. 4 showing in solid lines the condition of shank and tooth after prolonged wear and showing in dotted lines the original outline of the shank prior to wear;

FIG. 6 is a view similar to FIG. 4 showing the condition of the shank plate as in FIG. 5 with a new tooth installed.

The tooth which is the subject of this invention is illustrated in my foregoing described applications. Essentially it consists of a tapered distal portion 11 having cutting edges 12 which are reversible in the sense that the tapered top and bottom distal surfaces 13 are truncated at the front edge 14. Rearwardly at the top and bottom of surfaces 13 are proximal prongs or roots 16 on either side of the tooth separated from each other by a rectangular slot 17 which extends forwardly from the proximal end of the tooth. Slot 17 terminates at its forward end in a semicircular wall 18. Each prong 16 has a top and bottom surface 19 which are preferably flat and preferably parallel to each other but which may be slanted if desired. Side walls 21 are substantially vertical and define the sides of the slot 17. The outside edges 22 of the tooth are beveled at the top and bottom along the rear portion thereof. As illustrated herein, there are no transverse notches on the top and bottom surfaces 19 of the prongs 16 as are shown in certain embodiments of my invention described in the foregoing patent applications. However, such notches may be formed in the tooth and may be used as an auxiliary means for securing the tooth in position.

The tooth is received in a shank plate 26 which may be fastened by any convenient means such as by a bolt through hole 27 to a portion of the earth-digging tool such as, in this instance, an auger such as that shown in my Patent No. 2,578,014. The shape of the shank plate 26 is subject to wide modification, depending upon the use of the tools in which it is installed. As illustrated in the accompanying drawings, the shank plate is fastened by means of a carriage bolt (not shown) fitting through a bolt socket 27 to a holder or to the lower edge of an auguer blade. However, various other means may be employed. As further shown in FIG. 1, the shank plate 26 has provision for two teeth. However, it will be understood that the number of such teeth is also subject to variation and the position and inter-relationship of the various teeth may be altered depending upon the design of the device. The outermost tooth is installed in a socket 31 having an exposed curved outer edge 32, which, as the auger is turned, wears against the side of the hole being dug. With prolonged use the side edge 32 will gradually be worn away. It is a feature of the present invention that means is provided to protect the side of the shank plate against wear. The other tooth is held in a socket 33 which is disposed centrally of the hole and side wear on the shank in this area is not as great as in the outermost tooth area.

Each of the shank sockets 31, 33 provides means for receiving one of the teeth. As shown in FIG. 4 the shank socket 32 in cross section is generally H-shaped, the H being turned on its side. The connecting web 36 of the H fits into the slot 17 between the prongs 16 of the tooth. The bottom and top flanges 37, 38 engage the bottom and top surfaces of the prongs 16. The shape of the tooth recesses 39 between the flanges 37, 38 of the H are dimensioned to receive the prongs 16 of the tooth with a fairly tight fit.

In my co-pending patent application Serial No. 794,544, a means is shown for holding the toath in the shank, namely a resilient insert extending transversely through the web 36. However, in accordance with the present invention the resilient insert may be otherwise positioned. Thus a hole 41 is drilled upward through the bottom flange 37 and a groove 42 is formed in the surface of the bottom flange 37 rearward of the hole 41 and communicating with the bottom surface of the prong 16. A resilient insert 43 is inserted in the hole 14, prior to insertion of the tooth. The tooth is then driven into the recesses 39, the resilient insert 43 being compressed in the groove 42 and bearing tightly against the prong 16 so that the prong 16 cannot be accidentally dislodged. In order to facilitate removal of the tooth when it is necessary to reverse or replace the same, a groove 46 is gouged in the side 32 of the shank rearwardly of the recesses 39 and an instrument may be inserted in the groove 46 to drive the tooth forwardly against the resistance of the insert 43 and thus to knock the tooth out of its socket.

It will be understood that the position of the insert 43 is subject to considerable modification. Thus it may be positioned either in the top or the bottom flange 38, 37 and on either the inner or outer side of the tooth or in a plurality of such positions. The hole 41 may, if desired, be plugged after the resilient insert is installed.

The function of the tooth in protecting the shank plate against undue wear along the side edge 32 is illustrated by comparison of FIGS. 4, 5 and 6. As shown in FIG. 4, the edges of the shank plate are relatively new and project about even with the crown 47 of the beveled side edge 22 of the outermost tooth prong 16. With prolonged use, the side edge 32a of the shank has worn down to the solid line position of FIG. 5 from its original dotted line position and the side edge 22a is also worn to solid line position from its original dotted line position 22. After this time interval, it is likely that the point 14 of the tooth has also become worn. When the tooth is reversed or a new tooth installed (FIG. 6), the side edge 22 of the tooth projects beyond the worn side edge 32a of the shank and absorbs the abrasive action causing wear and protects the side edge 32a of the shank from undue additional wear. Accordingly the life of the shank plate 26 is prolonged by reason of the side edge 22 of the tooth being consumed at the same time that the point 14 thereof is being consumed.

What is claimed is:

1. In combination in an earth-digging tool, a tooth formed of a piece of hard material with a tapered distal portion and a proximal portion; a shank plate formed with a recess to receive said proximal portion, said shank plate being formed with an aperture opening into said recess, and a resilient insert partially in said aperture and partially in said recess and resiliently compressed in said recess between said tooth and said shank plate to frictionally restrain withdrawal of said tooth from said recess.

2. In combination in an earth-digging tool, a tooth formed of a piece of hard material with a tapered distal portion and a proximal portion; a shank plate formed with a recess to receive said proximal portion; said shank plate being formed with an aperture opening into said recess, the wall of said recess adjacent said aperture being formed with a rearwardly extending groove disposed at an angle to said aperture; and a resilient insert partially in said aperture and partially in said groove, said insert being compressed between said tooth and said shank plate to frictionally restrain withdrawal of said tooth from said recess.

3. In combination in an earth-digging tool, a tooth formed of a piece of hard material with a tapered distal portion and a proximal portion having top and bottom faces formed with a longitudinal slot extending forwardly from the proximal end of said tooth to divide said proximal portion into two prongs; a shank plate formed with a pair of recesses to receive said prongs, said shank plate having a web extending between said recesses and extending into said slot, said shank plate being formed with an aperture remote from said web and opening into one of said recesses; and a resilient insert extending partially into said aperture and partially into said recess, said insert being compressed between said tooth and said shank plate to frictionally restrain withdrawal of said tooth from said recess.

4. In combination in an earth-digging tool, a tooth formed of a piece of hard material with a tapered distal portion and a proximal portion having top and bottom faces formed with a longitudinal slot extending forwardly from the proximal end of said tooth to divide said proximal portion into two prongs; a shank plate formed with a pair of recesses to receive said prongs, said recesses being defined by flanges and an interconnecting web extending into said slot, one of said flanges being formed with an aperture opening into one of said recesses; and a resilient insert located partially in said aperture and partially in said recess and compressed between one of said prongs of said tooth and one of said flanges to frictionally restrain withdrawal of said tooth from said recess.

5. In combination in an earth-digging tool, a reversible tooth formed of a piece of hard material with a tapered distal portion and a proximal portion having top and bottom faces formed with a longitudinal slot extending forwardly from the proximal end of said tooth to divide said proximal portion into two prongs; a shank plate formed with a pair of recesses to receive said prongs, said recesses being defined by flanges and an interconnecting web extending into said slot, at least one of said flanges having at least one exposed side edge; and means for removably securing said tooth in said shank plate; said tooth having one of its side edges located in one of said recesses and extending transversely outwardly to the initial position of said exposed side edge of said flange, whereby, when said exposed side edge has been worn by usage of said tool, said tooth is installed in said shank plate with an unworn side edge extending transversely beyond the worn exposed side edge of said shank plate and further wear is substantially borne by said tooth.

6. In combination in an earth digging tool of a type wherein said tool is rotated about a longitudinal axis of rotation and simultaneously advanced along said axis to form a cylindrical hole, a reversible tooth formed of a hard piece of material with a tapered distal portion and a proximal portion; a shank plate formed with at least one recess to receive at least a portion of the proximal portion of said tooth, said recess being defined by at least one transversely extending flange having an exposed side edge, said side edge lying substantially concentric with said axis and on the outer edge of said tool to wear against the wall of said hole; and means for removably securing said tooth in said shank plate; said tooth having one of its side edges located in said recess and extending transversely outwardly to the initial position of said exposed side edge of said flange, whereby, when said exposed side edge of said flange has been worn by usage of said tool said tooth is installed in said shank plate with an unworn side edge of said tooth extending transversely beyond the worn exposed side edge of said shank plate and further wear is substantially borne by said tooth.

7. In a tooth formed of a unitary, hard piece of material for an earth digging tool of the type wherein is provided a shank having a front and formed with a pair of recesses extending substantially parallel to each other rearwardly of said front, said shank having a web with substantially parallel side walls separating said recesses, one said side wall facing each said recess, each said recess having substantially parallel top and bottom walls each transverse to one said side wall, said recesses being shaped to receive portions of said tooth, a resilient insert and means in said shank to retain said resilient insert within said shank, said resilient insert at least partially extending into at least one said recess to engage and resiliently retain said tooth and shank together; the improvement in said tooth comprising forwardly converging top and bottom flat distal faces extending substantially across the entire width of said tooth, proximal prongs extending rearwardly of said distal faces, said prongs being rectangular in cross-section, the thickness of said prongs being at least as great as the thickness of said tooth at any other portion of said tooth, the width of said tooth across the outer edges of the proximal ends of said prongs being no greater than the width of said tooth at any other portion of said tooth; said tooth formed with a slot extending forwardly from the proximal end of said tooth, dividing said proximal end into said prongs; the top and bottom faces of each said prong being substantially parallel and substantially co-planar, said slot extending from top to bottom of said tooth through the proximal end of said tooth and substantially perpendicular to said top and bottom faces of said prongs, the edges of said prongs facing inwardly toward said slot being substantially flat and parallel and substantially perpendicular to said top and bottom faces of said prongs, the outer edges of said prongs being spaced apart substantially the width of said distal faces, said tooth being imperforate forwardly of the forward end of said slot.

References Cited in the file of this patent

UNITED STATES PATENTS

| | | |
|---|---|---|
| 555,804 | Cummings | Mar. 3, 1896 |
| 775,770 | Herrod | Nov. 22, 1904 |
| 995,285 | Pemberton | June 13, 1911 |
| 1,280,696 | Firl | Oct. 8, 1918 |
| 2,279,960 | Terry | Apr. 14, 1942 |

FOREIGN PATENTS

| | | |
|---|---|---|
| 678,382 | Great Britain | Sept. 3, 1952 |